(12) United States Patent
Osher et al.

(10) Patent No.: US 8,760,489 B1
(45) Date of Patent: Jun. 24, 2014

(54) METHOD AND APPARATUS FOR DYNAMICALLY ADJUSTING ASPECT RATIO OF IMAGES DURING A VIDEO CALL

(71) Applicant: Vonage Network LLC, Holmdel, NJ (US)

(72) Inventors: Gil Osher, Tel-Aviv (IL); Ido Mintz, Burgata (IL); Sagie Machlin, Rishon Lezion (IL); Itay Bianco, Tel-Aviv (IL)

(73) Assignee: Vonage Network LLC, Holmdel, NJ (US)

( * ) Notice: Subject to any disclaimer, the term of this patent is extended or adjusted under 35 U.S.C. 154(b) by 0 days.

(21) Appl. No.: 13/926,755

(22) Filed: Jun. 25, 2013

(51) Int. Cl.
*H04N 7/14* (2006.01)
(52) U.S. Cl.
USPC ...................................... 348/14.07; 348/14.01
(58) Field of Classification Search
USPC ........................................... 348/14.01–14.16
See application file for complete search history.

(56) References Cited

U.S. PATENT DOCUMENTS

| 5,835,129 | A | 11/1998 | Kumar | |
|---|---|---|---|---|
| 7,113,200 | B2 | 9/2006 | Eshkoli | |
| 2003/0222973 | A1* | 12/2003 | Hiroi et al. | 348/14.01 |
| 2005/0259144 | A1* | 11/2005 | Eshkoli | 348/14.07 |
| 2010/0118110 | A1* | 5/2010 | Choi | 348/14.02 |
| 2011/0141219 | A1* | 6/2011 | Yeh | 348/14.02 |
| 2011/0216153 | A1* | 9/2011 | Tasker | 348/14.02 |
| 2013/0063538 | A1* | 3/2013 | Hubner et al. | 348/14.02 |

* cited by examiner

*Primary Examiner* — Stella Woo
(74) *Attorney, Agent, or Firm* — Moser Taboada; Joseph Pagnotta

(57) ABSTRACT

A method and apparatus for dynamically adjusting an aspect ratio of an image during a video call is described herein. Specifically, a method for dynamically adjusting the aspect ratio of an image during a video call may include obtaining at least one display parameter of a display device, performing a comparison of the at least one display parameter to at least one image capture parameter of a capture device, capturing an original image, modifying the original image based on the comparison performed, wherein the modified image has an adjusted aspect ratio different from an aspect ratio of the original image, and sending the modified image to the display device.

18 Claims, 6 Drawing Sheets

METHOD AND APPARATUS FOR DYNAMICALLY ADJUSTING ASPECT RATIO OF IMAGES DURING A VIDEO CALL

BACKGROUND OF THE INVENTION

1. Field of the Invention

Embodiments of the present invention generally relate to a method and apparatus to dynamically recognize when there is a resolution and/or aspect ratio mismatch between display devices and flexibly addressing differences in aspect ratios/display resolutions.

2. Description of the Related Art

Today, mobile users have access to hundreds of different smartphone models. Many of these models, even models from the same manufacturer, will have different screen sizes and screen resolutions. Smartphones also have video capability that permits users to participate in real-time video communications. When two users are on a video call, their respective viewing resolutions and/or aspect ratios may not match up with each others' camera resolutions and/or aspect ratios which may adversely affect the users' viewing experience. When users' aspect ratios/resolutions do not match up, attempts to modify the video data to fit in a different aspect ratio may cause the video image to be distorted and its viewing quality affected.

Accordingly, there exists a need for a method and apparatus to dynamically recognize when there is a resolution and/or aspect ratio mismatch between display devices and flexibly addressing differences in aspect ratios/display resolutions.

SUMMARY OF THE INVENTION

A method and apparatus for dynamically adjusting an aspect ratio of an image during a video call is described herein. Specifically, a method for dynamically adjusting the aspect ratio of an image during a video call may include obtaining at least one display parameter of a display device, performing a comparison of the at least one display parameter to at least one image capture parameter of a capture device, capturing an original image, modifying the original image based on the comparison performed, wherein the modified image has an adjusted aspect ratio different from an aspect ratio of the original image, and sending the modified image to the display device.

In some embodiments, an apparatus for dynamically adjusting an aspect ratio of an image during a video call may include at least one processor, at least one input device, and at least one storage device storing processor-executable instructions which, when executed by the at least one processor, performs a method including obtaining at least one display parameter of a display device, performing a comparison of the at least one display parameter to at least one image capture parameter of a capture device, capturing an original image, modifying the original image based on the comparison performed, wherein the modified image has an adjusted aspect ratio different from an aspect ratio of the original image, and sending the modified image to the display device.

In some embodiments, a method for dynamically adjusting an image capture parameter of a capture device during a video call may include obtaining a display parameter of a display device, performing a comparison of the display parameter to the image capture parameter, adjusting the image capture parameter based on the obtained display parameter from the display device, capturing an image using the adjusted capture parameter, and sending the image to the display device.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
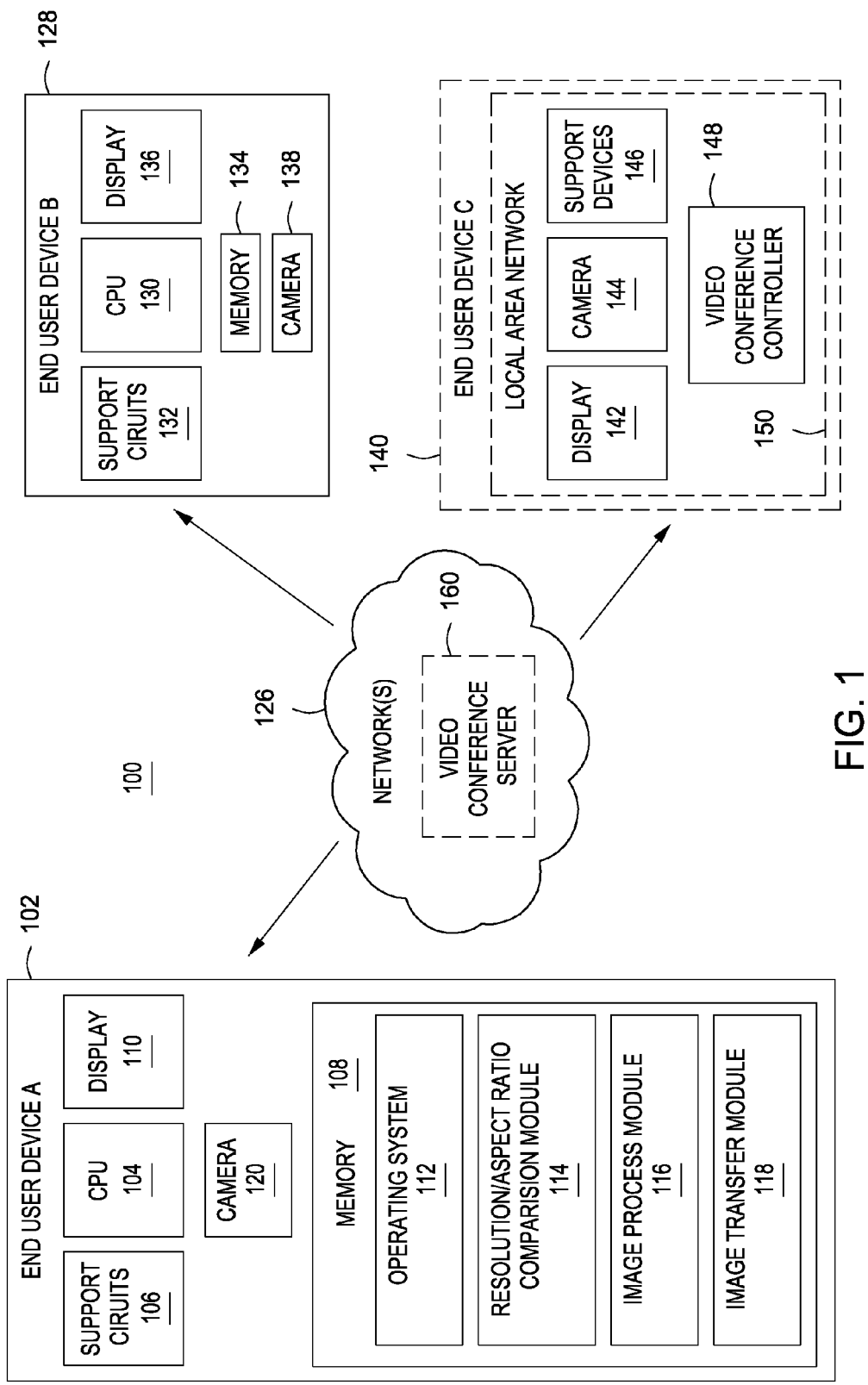
FIG. 1 depicts a block diagram of a system for dynamically adjusting the aspect ratio of images during a video call, in accordance with embodiments consistent with the present application.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Exemplary embodiments of the present invention include a method and apparatus that dynamically recognizes when there is a display resolution and/or aspect ratio mismatch between display devices and image acquisition devices (i.e., cameras and the like), and flexibly addresses differences in aspect ratios/display resolutions.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an exemplary video conferencing operating environment 100. Although described herein in terms of a video conferencing operating environment, the exemplary embodiments described herein may be used with any image/video transferring system. Video conferencing operating environment 100 may include a plurality of end user devices such as end user device A 102, end user device B 128, and end user device C 140 that share data streams amongst each other. Each end user device 102, 128 and 140 may encode at least one data stream to send directly to each other via network 126. For example, each end user device may have an image/video input such as a camera 120, 138, 144. The input may be used to generate a video stream (that may include audio) and encode the video stream before sending it to another end user device. As used herein, images may be video images or one or more still images. Each end user device may have an image/video display device such as a display 110, 136 and 142, to display the images received from another end user device. In some embodiments, each end user device 102, 128 and 140 may communicate via a video conference server 160 disposed on networks 126.

The networks 126 comprise one or more communication systems that connect computers by wire, cable, fiber optic and/or wireless link facilitated by various types of well-known network elements, such as hubs, switches, routers, and the like. The networks 126 may include an Internet Protocol (IP) network, a public switched telephone network (PSTN), or other mobile communication networks, and may employ various well-known protocols to communicate information amongst the network resources.

In some embodiments, an end user device may be a standalone end user device such as end user device A 102 and end user device B 128. End user device A 102 and end user device B 128 may each include a Central Processing Unit (CPU) (104, 130), support circuits (106, 132), memory (108, 134), a display (110, 136), and a camera (120, 138). The CPU 104, 130 may comprise one or more commercially available microprocessors or microcontrollers that facilitate data processing and storage. The various support circuits 106,132 facilitate the operation of end user device A 102 and end user device B 128, respectively. Support circuits 106,132 may include one or more audio input/output devices, clock circuits, power supplies, cache, other input/output circuits, and the like. The memory 108, 134 comprises at least one of Read Only Memory (ROM), Random Access Memory (RAM), disk drive storage, optical storage, removable storage and/or the like. In some embodiments, the memory 108,134 comprises an operating system 112, resolution/aspect comparison module 114, image processing module 116, and image transfer module 118. Operation of modules 114, 116, and 118 are described below in more detail with respect to FIG. 3.

In some embodiments, an end user device may be a collection of separate components that may be directly connected to each other or to a controller, and/or disposed on a local network such as end user device C 140. For example, in some embodiments end user device C 140 may include a display 142, camera 144, and support devices 146 (e.g., audio input/output devices) that may be coupled to a video conferencing controller 148 and communicate with each other via local area network 150.

In embodiments consistent with the present invention, end user devices 102, 128, 140 may dynamically recognize when there is a display resolution and/or aspect ratio mismatch between a camera 120, 138, 144 acquiring an image and displays 110, 136 and 142 displaying the acquired images that were sent. Embodiments consistent with the present invention may flexibly address these mismatches in aspect ratios/display resolutions.

Specifically, a display resolution of a display is the number of pixels in each dimension that can be displayed. A display resolution may be described as width×height with the units in pixels, density-independent pixels (dp), scale-independent pixels (sp), inches, millimeters, points (1/72 of an inch based on the physical size of the screen), etc. For example, a "1024× 768" display resolution means the width is 1024 pixels and the height is 768 pixels. The eye's perception of display resolution can be affected by a number of factors. One factor is the display aspect ratio. The display aspect ratio is the display screen's rectangular shape, which is expressed as the ratio of the picture width to the physical picture height as produced by the number of pixels in each linear dimension and the size and shape of each pixel. Aspect ratio is calculated by (width)/(height). For example, 1024 pixels/768 pixels=4:3 aspect ratio. An aspect ratio may be a ratio of pixels, density-independent pixels (dp), scale-independent pixels (sp), inches, millimeters, points (1/72 of an inch based on the physical size of the screen), etc.

A camera's resolution is the amount of detail that the camera can capture. The camera resolution is typically measured in pixels, but other units of measurements may also be used. The more pixels, the more detail the camera can capture. A camera's resolution in pixels also produces a rectangular shape, described herein as the camera aspect ratio, which is expressed as the ratio of the physical picture width to the physical picture height.

In many instances a camera's aspect ratio may not match up with a display device's aspect ratio. Typically, when a display device receives video data captured by a camera, it may be necessary for the receiving display device to modify the image based on the receiving display device's aspect ratio. Many displays use a "scaling engine" which is a digital video processor to match the incoming picture format to the display parameters. Original Aspect ratio (OAR), as used herein, is the aspect ratio in which a video image/stream is originally produced by the camera acquiring the image. Converting aspect ratios by the receiving device is typically done by enlarging/reducing the original image to fill the area. This may be done by the receiving device by cutting off the excess area (cropping) of the image, or by stretching the image to fill in the area according to the new ratio. As used herein, modified aspect ratio (MAR) is the aspect ratio modified to fit a type of screen, and different from the dimensions of the OAR in which the video image/stream was originally produced.

However, as noted above, when aspect ratios do not match up between the camera and the display device, attempts to modify the video data to fit in a different aspect ratio may cause the video image to be distorted and its viewing quality affected, or may needlessly use large amounts of bandwidth to send the entire image even though parts of the image may be cropped, and thus not shown, to fit the display devices display parameters.

Figure 2:
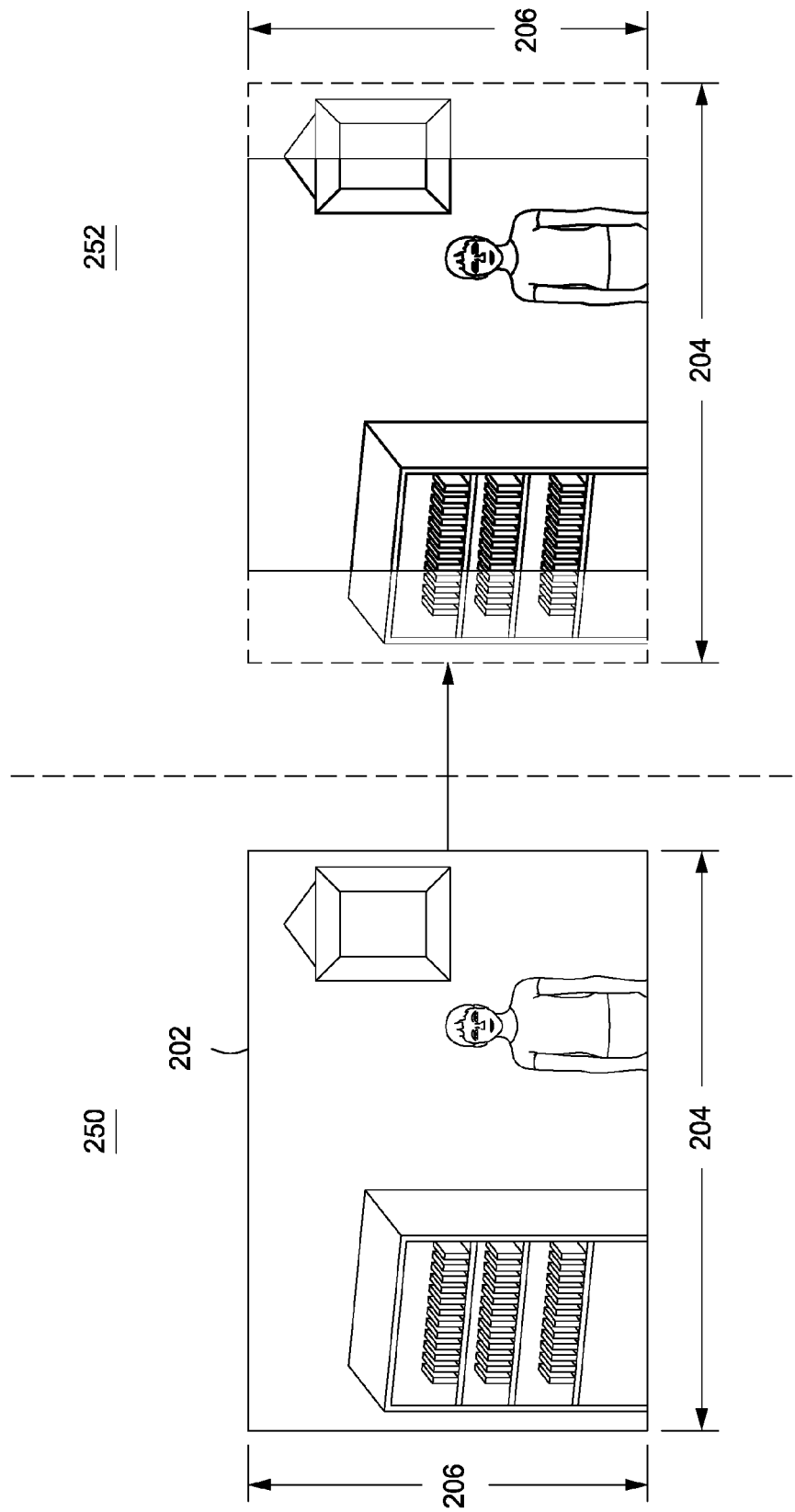
FIG. 2 depicts an existing system that modifies an image after the image has been sent to a receiving display device.

For example, as shown in FIG. 2, end user device 250 may have a camera that provides for a 480×800 pixel resolution. Thus, an image 202 captured the camera of end user device 250 may have a width 204 of 800 pixels and a height 206 of 480 pixels (i.e., the OAR). Meanwhile, end user device 252 may have a display screen that has a resolution of 480×640. In existing video transfer systems, end user device 250 will transmit the video at 480×800 which will require the receiving device, in this case end user device 252, to shrink/crop the video by 25% to a resolution of 480×640—leaving nearly 76,800 "wasted" pixels (160 pixel lines×480 pixel lines=76,800 pixels). This is a waste of bandwidth. Specifically, end user device 250 is transmitting 20% more data than can be viewed on end user device 252 which is undesirable for the end user (e.g., loss of information contained in picture, cost, time, etc.) and undesirable for the provider (wasting resources).

Figure 3:
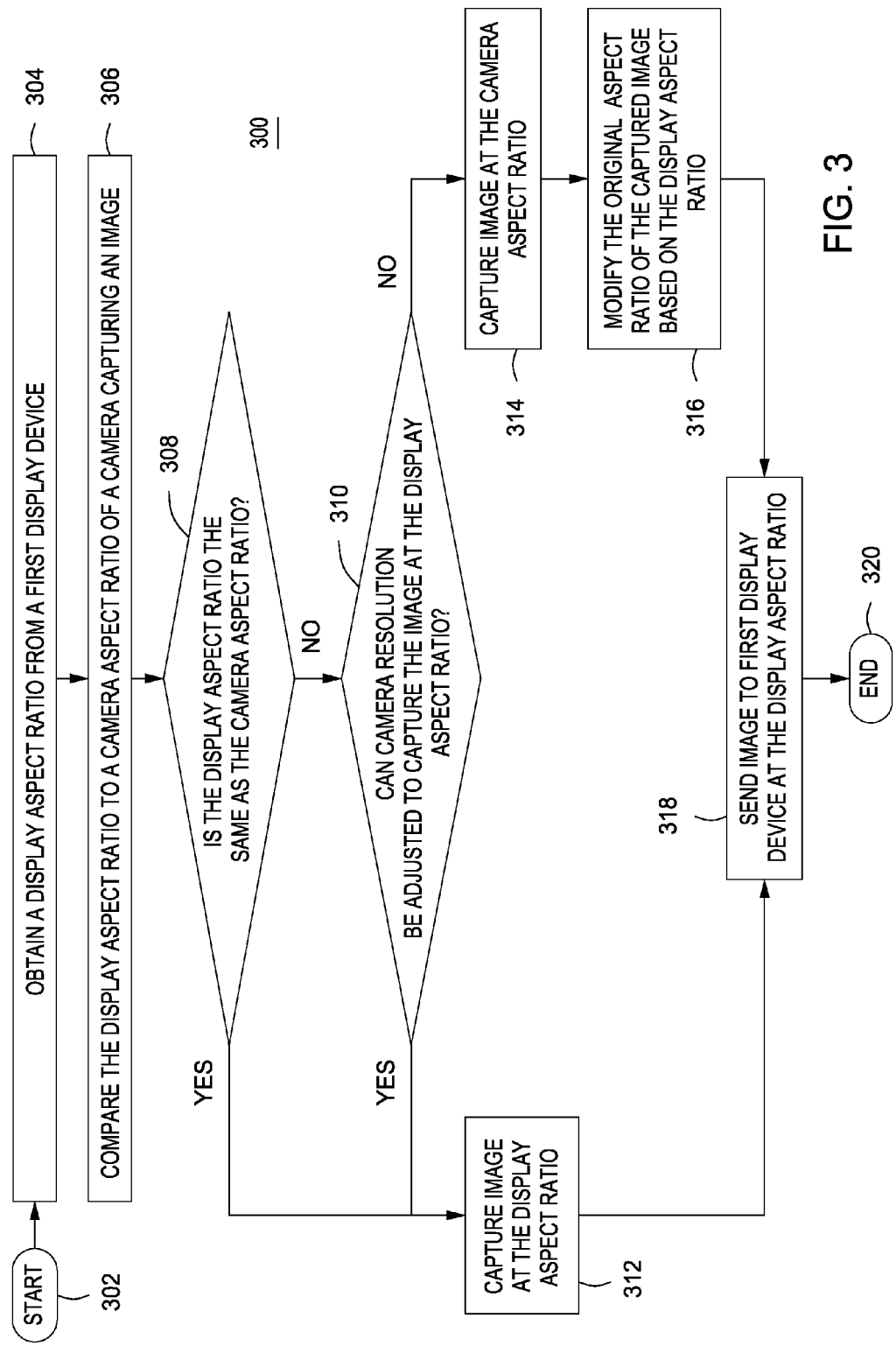
FIG. 3 depicts a flow diagram of a method for dynamically adjusting the aspect ratio of images during a video call, according to one or more embodiments of the invention.

Exemplary embodiments described herein advantageously solve the problems of existing video transfer systems by performing the necessary image modifications on captured videos to be sent on the sending device—that is, before the image is sent to a receiving display device. A method 300 in accordance with the subject invention is illustrated in FIG. 3 which depicts a flowchart having a series of steps for dynamically recognizing when there is a resolution/aspect ratio mismatch between an image acquisition device and a display device, and flexibly addressing differences in aspect ratios/display resolutions. For ease of understanding, the method will be described using end user device A 102 as the image capturing and sending device and end user device B 128 as the display device that receives and displays the captured images. However, any of the end user devices 102, 128 and 140 may be considered the sending or receiving device and may perform method 300 simultaneously.

In detail, the method 300 starts at 302 and proceeds to 304 where display parameters are obtained by the sending device from the receiving display device. The display parameters may include a display area aspect ratio, a display area width, a display area height, a display area resolution, or a display area maximum frame size parameter associated with the display device. For example, in some embodiments, end user device A 102 may first obtain a set of one or more display parameters from end user device B 128. The set of display parameters may include a display resolution (width and height) of display 136, an aspect ratio of display 136, maximum frame size parameters, image orientation (0°, 90°, 180° or 270°), whether is camera is a front or back camera (which can affect mirroring), FPS (frames per second), and the like.

In some embodiments, the display parameters may be obtained using Session Description Protocol (SDP). SDP is a format for describing streaming media initialization parameters. The Internet Engineering Task Force (IETF) published a revised specification as an IETF Proposed Standard as RFC 4566 in July 2006. As described in RFC 4566, SDP is intended for describing multimedia communication sessions for the purposes of session announcement, session invitation, and parameter negotiation. SDP does not deliver media itself but is used for negotiation between end points of media type, format, and all associated properties. The set of properties and parameters are often called a session profile.

In some embodiments, the display parameters may be sent to end user device A 102 in response to a request sent by end user device A 102 to end user device B 128 for said parameters. In other embodiments, end user device B 128 may automatically send display parameters to all end user devices, including end user device A 102, participating on a video teleconference or similar type of image transferring communication session via SDP or other protocol. In addition, in some embodiments, the display parameters may be exchanged directly between end user device A 102 and end user device B 128 via network 126, or using video conference server 160.

After the display parameters are received by end user device A 102, end user device A 102 will compare the display parameters to the capture device parameters. For example, at 306, the resolution/aspect ratio of display 136 is compared to the camera aspect ratio of camera 120 on end user device A 102. In some embodiments, this comparison may be performed by resolution/aspect ratio comparison module 114 on end user device a 102.

If, at 308, the display resolution/aspect ratio of display 136 is the same as the camera resolution/aspect ratio of camera 120, then end user device A 102 will capture video images using camera 120 and will not modify the images at 312. That is, the images will be captured by camera 120 at the display resolution/aspect ratio of display 136. At 318, the captured image, having a resolution/aspect ratio based on the display device, will be sent to end user device B 128 (i.e., the display device) using the image transfer module 118.

If, at 308, the display resolution/aspect ratio of display 136 is different than the camera resolution/aspect ratio of camera 120, then the method 300 proceeds to 310. At 310, it is determined whether the camera 120 resolution could be adjusted to capture the image at the display resolution/aspect ratio of end user device B 128. That is, it is determined whether camera 120 capture images to be taken at a lower resolution such that the resulting image has a resolution/aspect ratio the same as that of the display device. If the camera resolution can be adjusted, then end user device A 102 will adjust the camera resolution and capture video images at 312 using camera 120. At 318, the captured image, having a resolution/aspect ratio based on the display device, will be sent to end user device B 128 (i.e., the display device) using the image transfer module 118.

If, at 310, it is determined that the camera 120 resolution cannot be adjusted to capture images at the display resolution/aspect ratio of the display device, then, at 314, the images will be taken in the native resolution of the camera 120 (i.e., the camera resolution/aspect ratio). At 316, the original native resolution/aspect ratio of the captured image is modified based on the obtained display parameters of the display device as discussed below in further detail. In some embodiments, modification of the image may be performed by image processing module 116. Then, at 318 the modified image is sent to end user device B 128 (the display device). The method 300 ends at 320.

Modification of resolution/aspect ratio of the captured image at 316 of method 300 may involve one or more modifications including image reduction, cropping, normalizing, image rotation and the like. In some embodiments, end user device A 102 may simply crop the image such that as much of the picture as possible is preserved while matching that aspect ratio of display device 136 of end user device B 128 before sending the image to end user device B 128. In some embodiments, the image may be rotated. For example, if end user device A 102 captures at aspect ratio of 4:3 and the aspect ratio of display device 136 is 3:4, the image can be rotated. The user of display device 136 would then rotate their device, so their screen will actually be 4:3 and then the image will fit the screen. In some embodiments, various modifications/adjustments to the captured image may be dynamically performed as follows. In the following, the aspect ratio of camera 120 of end user device A 102 (i.e., the sending device) is $W_{camera}/H_{camera}$, and the aspect ratio of display 136 of end user device B 128 (i.e., the receiving display device) is $W_{disp}/H_{disp}$.

In some embodiments, if $H_{camera} > H_{disp}$ and $W_{camera} > W_{disp}$, or if $H_{camera} < H_{disp}$ and $W_{camera} < W_{disp}$, and the image may first be "normalized" to the display parameters of display 136 of end user device B 128. For example, in some embodiments, end user device A 102 may first normalize both the width and height of the image. As used herein, normalize describes the scaling of an image produced from a camera (e.g., camera 120) up to the point where $H_{camera} = H_{disp}$ or $W_{camera} = W_{disp}$, whichever comes first. Specifically, with the width normalized to the width of the display 136 of end user device B 128, the end user device A 102 will crop the excess height based on the height of display 136 of end user device B 128. Then, with height normalized to the height of display 136 of end user device B 128, the end user device A 102 may crop the excess width based on the width of display 136 of end user device B 128. The end user device A 102 will then compare both cropped versions of the image and determine which version preserves more relevant image information. In some embodiments, the relevant image information may be the amount of the person's face/body is preserved. The end user device A 102 will then select the cropped image that preserves the more information and send that image to end user device B 128. It should be noted that the comparison of which version preserves more relevant image information need not be performed on each frame of an ongoing video call. Once the comparison has been made, the decision may be saved and applied to subsequent frames.

In embodiments where $H_{camera} > H_{disp}$ and $W_{camera} = W_{disp}$, the end user device A 102 will crop the excess height based on the height of display 136 of end user device B 128. The end user device A 102 will then send the cropped image to end user device B 128. Similarly, in embodiments where $H_{camera} = H_{disp}$ and $W_{camera} > W_{disp}$, the end user device A 102 will crop the excess width based on the width of display 136 of end user device B 128. The end user device A 102 will then send the cropped image to end user device B 128.

Figure 4:
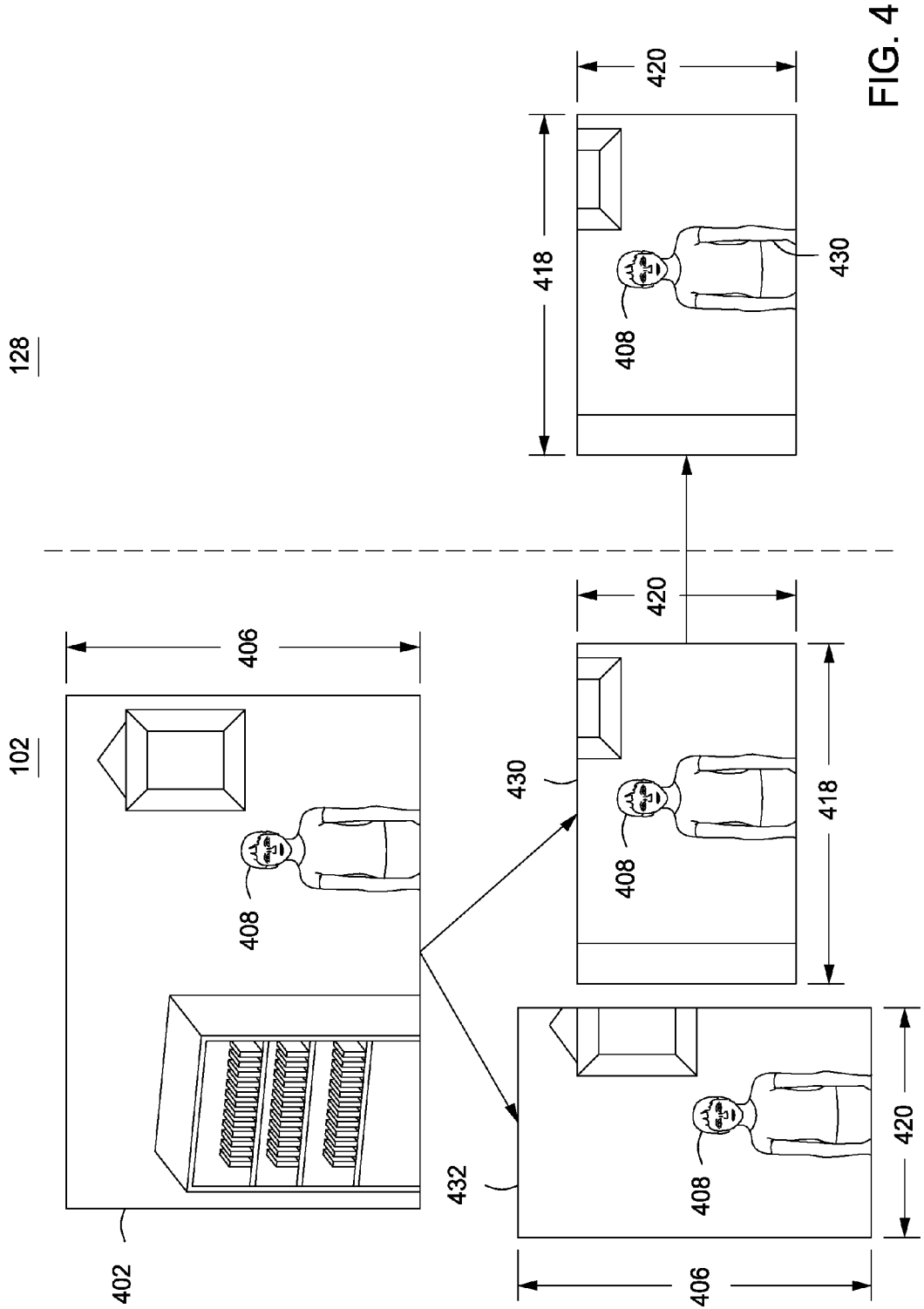
FIG. 4 depicts at least one exemplary embodiment consistent with the present invention that modifies an image before the image has been sent to a receiving display device.

In embodiments where $H_{camera} > H_{disp}$ and $W_{camera} < W_{disp}$, end user device A 102 may first crop the excess height (i.e., the portion of the image that exceeds the height of the maximum display height) and then see what percentage of the image has been cropped. For example, as shown in FIG. 4, end user device A 102 may first crop height $H_{camera}$ 406 of the image 402 to produce modified image 430 having a height $H_{disp}$ 420 and width $W_{disp}$ 418. Next, the end user device A 102 may then rotate image 402 and apply the appropriate algorithm to produce rotated image 432, and see what percentage of the original image 402 has been cropped. Finally, end user device A 102 will compare the two images 430 and 432, and select the one that preserves the more image information. In some embodiments, the relevant image information may include how much of the person's face/body 408 is preserved. The end user device A 102 will then send the selected image to end user device B 128. Similar image processing may be performed in situations where $H_{camera} < H_{disp}$ and $W_{camera} > W_{disp}$. In some embodiments, rotations may only relevant for screens that can be rotated (e.g., like smart phones screens). If, for example, the screen can be rotated and an image is captured by camera 120 at an aspect ratio of 16:9 while display 136 has an aspect ratio of 10:16, display 136 can rotated to be at aspect ratio of 16:10, and then the image could be cropped the image to fit 16:9.

In some embodiments where $H_{camera} = H_{disp}$ and $W_{camera} < W_{disp}$, the end user device A 102 may send the video image without modification to end user device B 128. Alternatively, in some embodiments, may end user device A 102 "normalize" the width and crop any excess height that is created when the width is normalized. The end user device A 102 will then send the modified image to end user device B 128.

Similarly, when $H_{camera} < H_{disp}$ and $W_{camera} = W_{disp}$ the end user device A 102 may send the video image without modification to end user device B 128. Alternatively, in some embodiments, may end user device A 102 "normalize" the height and crop any excess width that is created when the height is normalized. The end user device A 102 will then send the modified image to end user device B 128.

In embodiments where $H_{camera} = H_{disp}$ and $W_{camera} = W_{disp}$, the end user device A 102 will send the video image without modification to end user device B 128. Again, it should be noted that the appropriate image transformation may not need to be re-calculated for each frame in an ongoing video call; rather, once the proper transformation (i.e., normalization, cropping, rotation, etc.) has been calculated, it may be applied automatically to subsequent frames.

Figure 5:
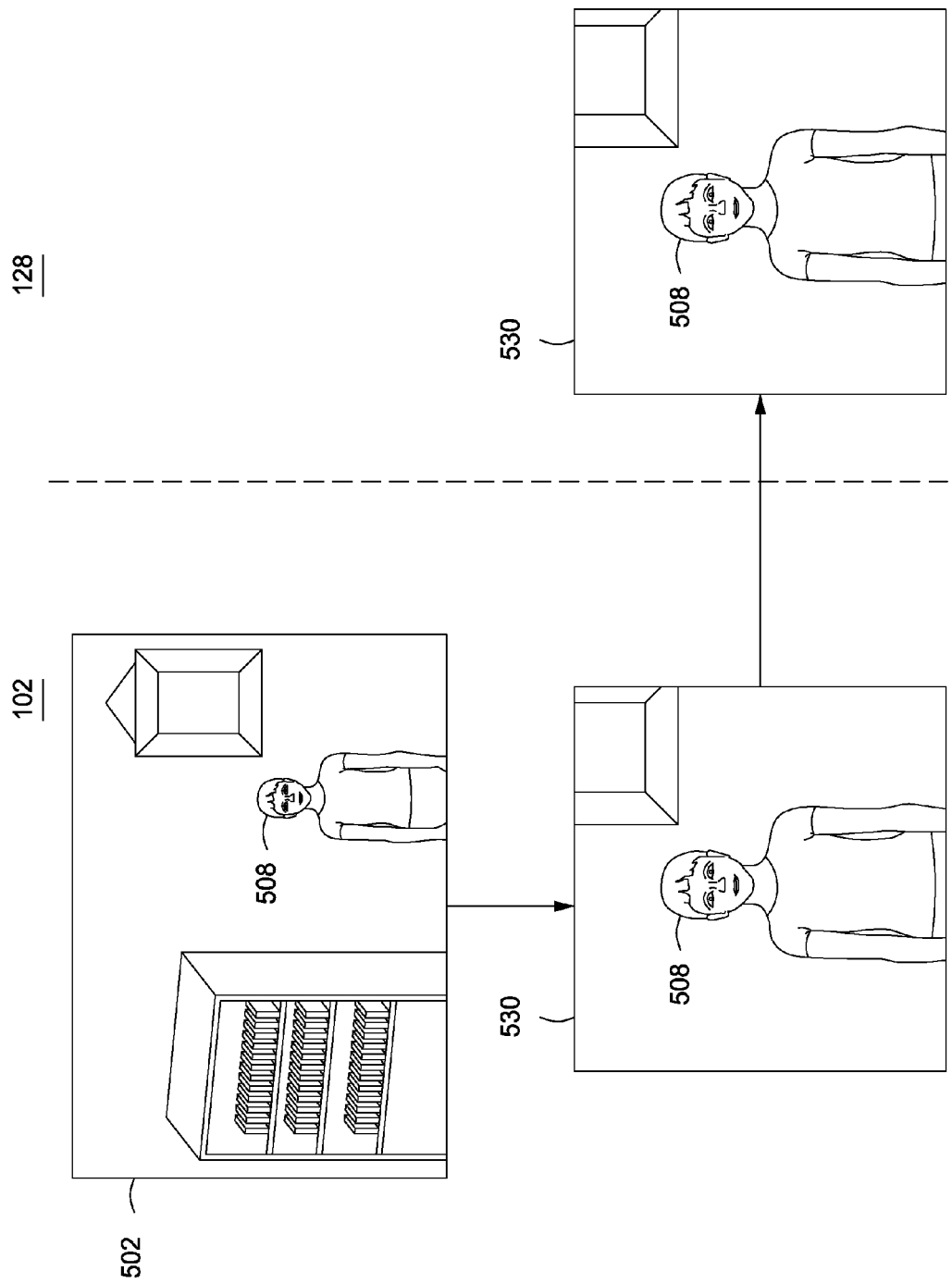
FIG. 5 depicts at least one exemplary embodiment consistent with the present invention that modifies an image and uses facial recognition before the image has been sent to a receiving display device.

FIG. 5 depicts at least one exemplary embodiment consistent with the present invention where end user device A 102 uses facial recognition to recognize the existence of a person 508 in the image 502. Facial recognition techniques may be used to recognize placement of the face and take into account when making cropping/image modification decisions discussed above. For example, the use of facial recognition techniques in conjunction with the image modification discussed above, may include instructions that no more than X pixels, inches, etc. may be cropped from height or cropped from the width of image 502 to produce image 530. In some embodiments, the facial recognition techniques may include using a "Haar Cascade" algorithm, or any other facial recognition algorithm, to detect person 508 within images. In addition, the facial recognition may also center the person's face before cropping equally on each side. This could do this dynamically as the person's face moves during a video conference call.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 6:
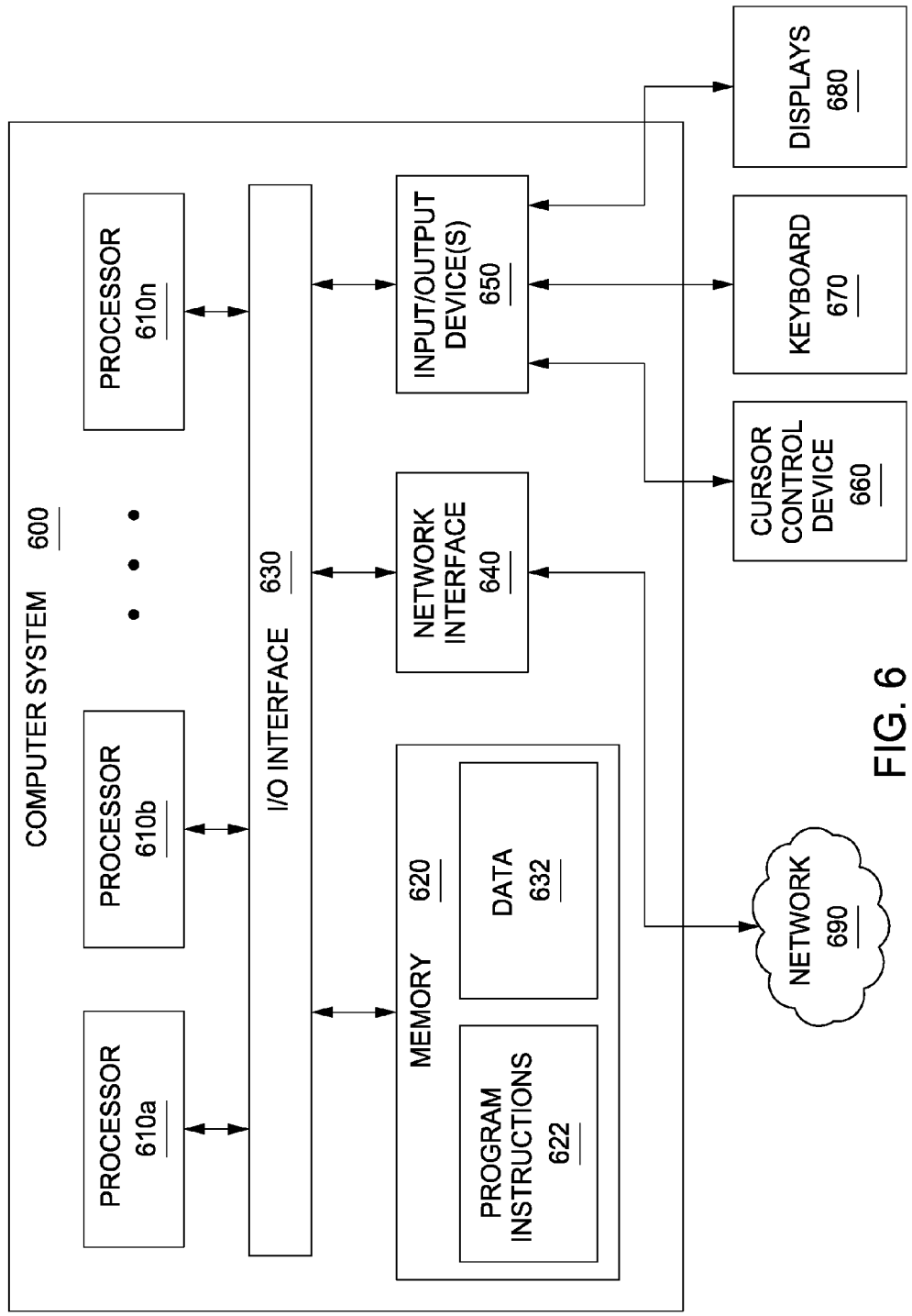
FIG. 6 is a detailed block diagram of a computer system, according to one or more embodiments.

FIG. 6 depicts a computer system 600 that can be utilized in various embodiments of the present invention to implement the computer and/or the display, according to one or more embodiments.

Various embodiments of method and apparatus for transitioning between a plurality of pages on a display device, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement method 300 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, smart phones, tablets, TVs, car entertainments systems, wearable computing devices, personal computer systems, mainframe computer systems, handheld computers, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIG. 3. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for dynamically adjusting an aspect ratio of an image during a video call comprising:
   obtaining at least one display parameter of a display device having a display area;
   determining that an image capture width is greater than a display area width, and that an image capture height is greater than a display area height based on a comparison of the at least one display parameter to at least one image capture parameter of a capture device;
   capturing an original image;
   modifying the original image based on the comparison performed, wherein the modified image has an adjusted aspect ratio different from an aspect ratio of the original image, and wherein modifying the original image includes:
      normalizing a width of the original image to the display area width to produce a first intermediate image;
      cropping any excess height of the first intermediate image that is greater than the display area height;
      normalizing a height of the original image to the display area height to produce a second intermediate image;
      cropping any excess width of the second intermediate image that is greater than the display area width;
      comparing the first intermediate image and the second intermediate image to determine which image preserves more relevant image information; and
      selecting the image that preserves more relevant image information as the modified image to send to the display device; and
   sending the modified image to the display device.

2. The method of claim 1, wherein the at least one display parameter includes at least one of a display area aspect ratio, width, height, display resolution, or maximum frame size parameter associated with the display device.

3. The method of claim 2, wherein the at least one image capture parameter includes at least one of an image capture aspect ratio, width, height, resolution, or maximum frame size parameter associated with the capture device.

4. The method of claim 1, wherein performing the comparison includes comparing the display area height associated with the display device and the image capture height associated with the capture device, and comparing the display area width associated with the display device and the image capture width associated with the capture device.

5. The method of claim 4, wherein if the image capture width is equal to the display area width, and if the image capture height is greater than the display area height, then modifying the original image includes cropping an excess height of the captured image that is greater than the display area height.

6. The method of claim 4, wherein if the image capture height is equal to the display area height, and if the image capture width is greater than the display area width, then modifying the original image includes cropping any excess width of the captured image that is greater than the display area width.

7. The method of claim 1, wherein the aspect ratio of the original image is a ratio of a width of the original image and a height of the original image, and wherein the adjusted aspect ratio of the modified image is a ratio of a width of the modified image and a height of the modified image.

8. The method of claim 7, wherein the aspect ratio and adjusted aspect ratio are measured as a ratio of one of pixels, density-independent pixels (dp), scale-independent pixels (sp), inches or millimeters, or points.

9. The method of claim 1, wherein modifying the original image further includes performing facial recognition techniques to recognize placement of the face prior to modifying the original image.

10. The method of claim 9, wherein the facial recognition techniques may include using a Haar Cascade algorithm to detect a person within the original image.

11. A method for dynamically adjusting an aspect ratio of an image during a video call comprising:
   obtaining at least one display parameter of a display device having a display area;
   determining that an image capture height is greater than a display area height, and that an image capture width is less than a display area width based on a comparison of the at least one display parameter to at least one image capture parameter of a capture device;
   capturing an original image;
   modifying the original image based on the comparison performed, wherein the modified image has an adjusted aspect ratio different from an aspect ratio of the original image, and wherein modifying the original image includes:
   cropping the original image based on the display area height and the display area width to produce a first intermediate image;
   rotating the original image;
   cropping the rotated image based on the display area height and the display area width to produce a second intermediate image;
   comparing the first intermediate image and the second intermediate image to determine which image preserves more relevant image information; and
   selecting the image that preserves more relevant image information as the modified image to send to the display device; and
   sending the modified image to the display device.

12. Apparatus for dynamically adjusting an aspect ratio of an image during a video call comprising:
   a) at least one processor;
   b) at least one input device; and
   c) at least one storage device storing processor-executable instructions which, when executed by the at least one processor, performs a method including
   1) obtaining at least one display parameter of a display device having a display area,
   2) determining that an image capture width is greater than a display area width, and that an image capture height is greater than a display area height based on a comparison of the at least one display parameter to at least one image capture parameter of a capture device,
   3) capturing an original image,
   4) modifying the original image based on the comparison performed, wherein the modified image has an adjusted aspect ratio different from an aspect ratio of the original image, and wherein modifying the original image includes:
      normalizing a width of the original image to the display area width to produce a first intermediate image;
      cropping any excess height of the first intermediate image that is greater than the display area height;
      normalizing a height of the original image to the display area height to produce a second intermediate image;
      cropping any excess width of the second intermediate image that is greater than the display area width;
      comparing the first intermediate image and the second intermediate image to determine which image preserves more relevant image information; and
      selecting the image that preserves more relevant image information as the modified image to send to the display device, and
   5) sending the modified image to the display device.

13. The apparatus of claim 12, wherein the at least one display parameter includes at least one of a display area aspect ratio, width, height, display resolution, or maximum frame size parameter associated with the display device.

14. The apparatus of claim 12, wherein the at least one image capture parameter includes at least one of an image capture aspect ratio, width, height, resolution, or maximum frame size parameter associated with the capture device.

15. The apparatus of claim 12, wherein performing the comparison includes comparing the display area height associated with the display device and the image capture height associated with the capture device, and comparing the display area width associated with the display device and the image capture width associated with the capture device.

16. The apparatus of claim 15, wherein if the image capture width is equal to the display area width, and if the image capture height is greater than the display area height, then modifying the original image includes cropping an excess height of the captured image that is greater than the display area height.

17. The apparatus of claim 15, wherein if the image capture height is equal to the display area height, and if the image capture width is greater than the display area width, then modifying the original image includes cropping any excess width of the captured image that is greater than the display area width.

18. Apparatus for dynamically adjusting an aspect ratio of an image during a video call comprising:
   a) at least one processor;
   b) at least one input device; and
   c) at least one storage device storing processor-executable instructions which, when executed by the at least one processor, performs a method including
   1) obtaining at least one display parameter of a display device having a display area,
   2) determining that an image capture height is greater than a display area height, and if an image capture width is less than a display area width based on performing based on a comparison of the at least one display parameter to at least one image capture parameter of a capture device,
3) capturing an original image,
4) modifying the original image based on the comparison performed, wherein the modified image has an adjusted aspect ratio different from an aspect ratio of the original image, and wherein modifying the original image includes:
   cropping the original image based on the display area height and the display area width to produce a first intermediate image;
   rotating the original image;
   cropping the rotated image based on the display area height and the display area width to produce a second intermediate image;
   comparing the first intermediate image and the second intermediate image to determine which image preserves more relevant image information; and
   selecting the image that preserves more relevant image information as the modified image to send to the display device, and
5) sending the modified image to the display device.

\* \* \* \* \*